United States Patent
Sultan et al.

(10) Patent No.: US 11,260,903 B2
(45) Date of Patent: Mar. 1, 2022

(54) VARIABLE LINKAGE FOR TIE-RODS

(71) Applicant: The Boeing Company, Chicago, IL (US)

(72) Inventors: Saif Sultan, Bothell, WA (US); Joshua R. Binder, Seattle, WA (US); Sean Richard Cysewski, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 24 days.

(21) Appl. No.: 16/819,430

(22) Filed: Mar. 16, 2020

(65) Prior Publication Data

US 2021/0284232 A1 Sep. 16, 2021

(51) Int. Cl.
    *B62D 7/20*      (2006.01)
    *B62D 7/16*      (2006.01)

(52) U.S. Cl.
    CPC    *B62D 7/20* (2013.01); *B62D 7/16* (2013.01)

(58) Field of Classification Search
    CPC ..... B62D 7/20; B62D 7/16; F16C 7/02; F16C 7/06; F16C 7/08; Y10T 74/2151; Y10T 74/206
    See application file for complete search history.

(56) References Cited

U.S. PATENT DOCUMENTS

| | | | | |
|---|---|---|---|---|
| 363,522 A | * | 5/1887 | Knous | B62M 3/02 74/594.1 |
| 1,211,763 A | * | 1/1917 | Schaefer | F16C 7/02 74/579 R |
| 1,227,743 A | * | 5/1917 | Burgedorff | B62M 3/02 74/594.1 |
| 1,242,090 A | * | 10/1917 | Ward | F16C 7/06 74/586 |
| 1,263,608 A | * | 4/1918 | Schaefer | F16C 7/026 74/579 R |

(Continued)

FOREIGN PATENT DOCUMENTS

FR     1256095 A   *   3/1961     ......... F16H 7/14

OTHER PUBLICATIONS

EPO Translation of the Description of FR 1256095 A, Lacour, Mar. 17, 1961. (Year: 2021).*

*Primary Examiner* — Daniel D Yabut
(74) *Attorney, Agent, or Firm* — Parsons Behle & Latimer (57) ABSTRACT

Apparatus, systems, and methods that include a variable length linkage for connecting together tie rods. The linkage includes first, second, and third apertures. There is a first distance between the first aperture and the second aperture and a second distance between the first aperture and the third aperture. The apparatus may include a fourth aperture having a third distance between the first aperture and the fourth aperture. The second, third, and fourth apertures may each have a non-circular cross-section. The linkage may include a base, a first finger, a second finger, and a third finger that each extend from the base. The first aperture may be in the base, the second aperture may be in the first finger, the third aperture may be in the second finger, and the fourth aperture may be in the third finger. The first aperture may be oriented vertically with the other apertures oriented horizontally.

20 Claims, 4 Drawing Sheets

(56) References Cited

U.S. PATENT DOCUMENTS

| | | | | | |
|---|---|---|---|---|---|
| 1,309,220 | A | * | 7/1919 | Schaefer | F16C 7/08 74/579 R |
| 1,435,720 | A | * | 11/1922 | McGahey | B61F 5/52 403/3 |
| 1,595,333 | A | * | 8/1926 | Anderson | B21K 1/766 74/579 R |
| 1,657,875 | A | * | 1/1928 | Wright | B61H 13/34 74/579 R |
| 1,828,707 | A | * | 10/1931 | Sanders | B62D 7/16 280/93.511 |
| 1,959,670 | A | * | 5/1934 | Hamilton | B61H 13/36 29/527.5 |
| 3,467,420 | A | * | 9/1969 | Svensson | F16C 7/06 403/104 |
| 6,253,638 | B1 | * | 7/2001 | Bermudez | B62M 3/02 74/594.1 |
| 6,598,837 | B1 | * | 7/2003 | Howard | A61J 9/0638 248/102 |
| 2004/0206202 | A1 | * | 10/2004 | Hultquist | B60S 1/245 74/594 |

* cited by examiner

410
CONNECT A FIRST TIE ROD TO A LINKAGE VIA A FIRST APERTURE, WHEREIN THE LINKAGE INCLUDES A SECOND APERTURE POSITIONED A FIRST DISTANCE FROM THE FIRST APERTURE, A THIRD APERTURE POSITIONED A SECOND DISTANCE FROM THE FIRST APERTURE, AND A FOURTH APERTURE POSITIONED A THIRD DISTANCE FROM THE FIRST APERTURE

415
A LUG OF THE FIRST TIE ROD IS CONNECTED TO THE LINKAGE

420
CONNECT A SECOND TIE ROD TO THE LINKAGE, WHEREIN THE SECOND TIE ROD IS CONNECTED TO THE LINKAGE VIA THE SECOND APERTURE, THE THIRD APERTURE, OR THE FOURTH APERTURE

425
A CLEVIS OF THE SECOND TIE ROD IS CONNECTED TO THE LINKAGE

435
PREVENT ROTATION OF THE LINKAGE BETWEEN THE FIRST TIE ROD AND THE SECOND TIE ROD

*FIG. 10*

VARIABLE LINKAGE FOR TIE-RODS

FIELD OF THE DISCLOSURE

The examples described herein relate to apparatus, systems, and methods of a variable length linkage for connected tie rods together.

BACKGROUND

Description of the Related Art

Tie rods are used to attach secondary structure to primary structure in various applications such as aerospace applications. Often tie rods are fixed in length or may include a slightly adjustable threaded end. The fixed length of tie rods requires the design of specific lengths of tie rods for each new implementation. The design of each specific tie rod for a new application may increase costs as well as length the overall design time. Further, a large number of lengths of tie rods may need to be cataloged and inventoried for each application currently being offered. Other disadvantages may exist.

SUMMARY

The present disclosure is directed to apparatus, systems, and methods of a variable length linkage for connected tie rods together.

One example of the present disclosure is an apparatus comprising a linkage and a first aperture through the linkage. The apparatus includes a second aperture through the linkage and a third aperture through the linkage. There is a first distance between the first aperture and the second aperture and a second distance between the first aperture and the third aperture with the second distance differing from the first distance.

The apparatus may include a fourth aperture through the linkage having a third distance between the first aperture and the fourth aperture with the third distance differing from the first distance and differing from the second distance. The second aperture, the third aperture, and the fourth aperture may each have a non-circular cross-section. The first distance may be 0.5 inch. The second distance may be 1.0 inch. The third distance may be 1.5 inches.

The linkage may include a base, a first finger that extends from the base, a second finger that extends from the base, and a third finger that extends from the base. The first aperture may extend through the base, the second aperture may extend through the first finger, the third aperture may extend through the second finger, and the fourth aperture may extend through the third finger. The first distance may be 1 inch. The second distance may be 2 inches. The third distance may be 3 inches. The first aperture may be oriented vertically through the linkage and the second aperture, the third aperture, and the fourth aperture may be oriented horizontally through the linkage. The second finger may include a fifth aperture and the third finger may include a sixth aperture.

One example of the present disclosure is a system that comprises a linkage that includes a first aperture, a second aperture, a third aperture, and a fourth aperture. The system includes a first tie rod connected to the linkage via the first aperture. The system includes a second tie rod. The first tie rod is positioned a first distance from the second tie rod when the second tie rod is connected to the linkage via the second aperture. The first tie rod is positioned a second distance from the second tie rod when the second tie rod is connected to the linkage via the third aperture. The first tie rod is positioned a third distance from the second tie rod when the second tie rod is connected to the linkage via the fourth aperture.

The first tie rod may include a first lug and the second tie rod may include a second lug. The first lug may include a first opening having a circular cross-section and the second lug may include a second opening having a non-circular cross-section. The second aperture, the third aperture, and the fourth aperture may have a non-circular cross-section. The linkage may include a base, a first finger that extends from the base, a second finger that extends from the base, and a third finger that extends from the base. The first aperture may extend through the base. The second aperture may extend through the first finger. The third aperture may extend through the second finger. The fourth aperture may extend through the third finger. The first aperture may be oriented vertically through the linkage and the second aperture, third aperture, and the fourth aperture may be oriented horizontally through the linkage. The first tie rod may include a lug configured to connect to the linkage via the first aperture and the second tie rod may include a clevis configured to connect to the linkage via the second aperture, the third aperture, or the fourth aperture.

One example of the present disclosure is a method comprising connecting a first tie rod to a linkage via a first aperture, wherein the linkage includes a second aperture positioned a first distance from the first aperture, a third aperture positioned a second distance from the first aperture, and a fourth aperture positioned a third distance from the first aperture. The method includes connecting a second tie rod to the linkage, wherein the second tie rod is connected to the linkage via the second aperture, the third aperture, or the fourth aperture. The method may include connecting a lug of the first tie rod to the linkage and connecting a clevis of the second tie rod to the linkage. The method may include preventing rotation of the linkage between the first tie rod and the second tie rod.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

Figure 1:
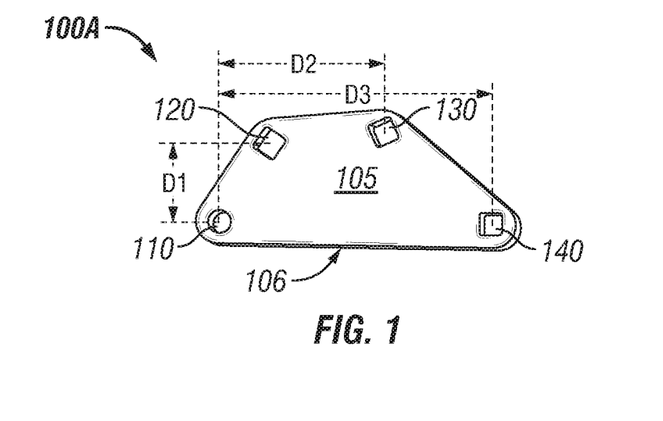
FIG. 1 shows a schematic of an example of a variable length linkage.

FIG. 1 shows a schematic of an example of a variable length linkage 100A. The linkage 100A includes a top surface 105 and a bottom surface 106. The linkage 100A includes a first aperture 110 through the linkage 100A, a second aperture 120 through the linkage 100A, a third aperture 130 through the linkage 100A, and a fourth aperture 140 through the linkage 100A. The apertures 110, 120, 130, 140 are configured to enable tie rods to be connected together via the linkage 100A as discussed herein.

The second aperture 120 is located a first distance D1 from the first aperture 110. The third aperture 130 is located a second distance D2 from the first aperture 110. The fourth aperture 140 is located a third distance D3 from the first aperture 110. The different distances D1, D2, D3 enable the linkage 100A to provide variable distances between tie rods as discussed herein. For example, a first tie rod may be connected to the linkage 100A via the first aperture 110 and a second tie rod may be connected to the linkage 100A via the second aperture 120. In this configuration, the two tie rods are located a first distance D1 apart. If the second tie rod is connected to the linkage 100A via the third aperture 130, the two tie rods would be located a second distance D2 apart. If the second tie rod is connected to the linkage 100A via the fourth aperture 140, the two tie rods would be located a third distance D3 apart. The three distances D1, D2, D3 differ in length. The lengths may be varied depending on the application. For example, in one application D1 may be 0.5 inch, D2 may be 1.0 inch, and D3 may be 1.5 inches. The number, size, shape, and/or configuration of the apertures 110, 120, 130, 140 may be varied as would be appreciated by one of ordinary skill in the art having the benefit of this disclosure. For example, the total number of apertures may be three (3), four (4), or more than four (4) depending on the application. Likewise, the size of the linkage and the distances between the apertures may also be varied within the scope of this disclosure.

The shape of the apertures may be configured to prevent the rotation of the linkage 100A when connected to two tie rods. For example, one or more the apertures 110, 120, 130, 140 may be configured to have a non-circular cross-section, which will prevent the rotation of the linkage 100A when connected between two tie rods. For example, the second aperture 120, the third aperture 130, and the fourth aperture 140 may have a non-circular cross-section. The non-circular cross-section may be, but is not limited to, a rectangular cross-section, an elliptical cross-section, or other polygonal non-circular shapes. The first aperture 110 may have a circular cross-section to enable the linkage 100A to be rotated enabling the linkage 100A to be connected via the second aperture 120, the third aperture 130, or the fourth aperture 140. The cross-sectional shapes of the apertures 110, 120, 130, 140 may be non-circular for applications that may apply compression or tension on the linkage 100A. The cross-sectional shapes of the apertures 110, 120, 130, 140 may be circular for applications that may apply only tension on the linkage 100A.

Figure 2:
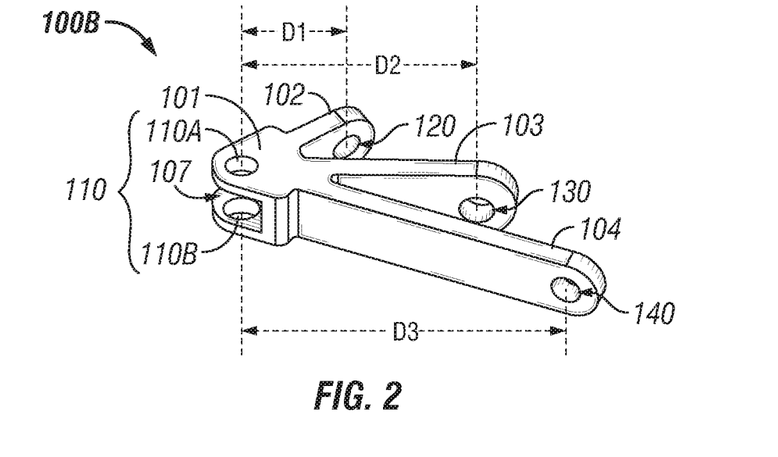
FIG. 2 shows a schematic of an example of a variable length linkage.

FIG. 2 shows a schematic of an example of a variable length linkage 100B. The linkage 100B includes a base 101, a first finger 102, a second finger 103, and a third finger 104 with each of the fingers 102, 103, 104 extending from the base 101. The linkage 100B includes first apertures 110A, 110B in the base 101 of the linkage 100B. The base 101 includes an opening 107 for the insertion of a lug end of a tie rod between the first apertures 110A, 110B as discussed herein. First apertures 110A, 110B may be collectively referred to as first aperture 110 as the first apertures 110A, 110B collectively enable a tie rod to be connected to the linkage 100B as discussed herein. The linkage 100B includes a second aperture 120 in the first finger 102, a third aperture 130 in the second finger 103, and a fourth aperture 140 in the third finger 104. The apertures 110, 120, 130, 140 are configured to enable tie rods to be connected together via the linkage 100B as discussed herein.

The second aperture 120 is located a first distance D1 from the first aperture 110. The third aperture 130 is located a second distance D2 from the first aperture 110. The fourth aperture 140 is located a third distance D3 from the first aperture 110. The different distances D1, D2, D3 enable the linkage 100B to provide variable distances between tie rods as discussed herein. For example, a first tie rod may be connected to the linkage 100B via the first aperture 110 and a second tie rod may be connected to the linkage 100B via the second aperture 120. In this configuration, the two tie rods are located a first distance D1 apart. If the second tie rod is connected to the linkage 100B via the third aperture 130, the two tie rods would be located a second distance D2 apart. If the second tie rod is connected to the linkage 100B via the fourth aperture 140, the two tie rods would be located a third distance D3 apart. The three distances D1, D2, D3 differ in length. The lengths may be varied depending on the application. For example, in one application D1 may be 1 inch, D2 may be 2.0 inches, and D3 may be 3.0 inches. The number, size, shape, and/or configuration of the apertures 110, 120, 130, 140 may be varied as would be appreciated by one of ordinary skill in the art having the benefit of this disclosure. For example, the total number of apertures may be three (3), four (4), or more than four (4) depending on the application. Likewise, the size of the linkage and the distances between the apertures may also be varied within the scope of this disclosure.

The first aperture 110 may be orientated on a different plane than the second, third, and fourth apertures 120, 130, 140. For example, the first aperture 110 may be oriented vertically with respect to the linkage 100B and each of the second aperture 120, the third aperture 130, and the fourth aperture 140 may be orientated horizontally with respect to the linkage 100B. In other words, the axis of rotation of a fastener positioned within the first aperture 110 may be orientated in a normal direction with respect to the axes of rotation of fasteners positioned within either the second aperture 120, the third aperture 130, or the fourth aperture 140.

Figure 3:
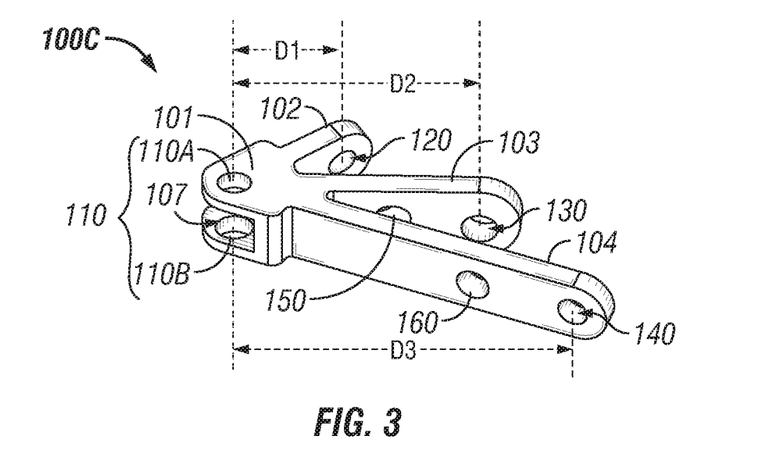
FIG. 3 shows a schematic of an example of a variable length linkage.

FIG. 3 shows a schematic of an example of a variable length linkage 100C. The linkage 100C includes a base 101, a first finger 102, a second finger 103, and a third finger 104 with each of the fingers 102, 103, 104 extending from the base 101. The linkage 100C includes first apertures 110A, 110B in the base 101 of the linkage 100C. The base 101 includes an opening 107 for the insertion of a lug end of a tie rod between the first apertures 110A, 110B as discussed herein. First apertures 110A, 110B may be collectively referred to as first aperture 110 as the first apertures 110A, 110B collectively enable a tie rod to be connected to the linkage 100C as discussed herein. The linkage 100C includes a second aperture 120 in the first finger 102. The linkage 100C includes a third aperture 130 and a fifth aperture in the second finger 103. The linkage 100C includes a fourth aperture 140 and a sixth aperture in the third finger 104. The apertures 110, 120, 130, 140, 150, 160 are configured to enable tie rods to be connected together via the linkage 100C as discussed herein. The fifth aperture 150 may enable a portion of a fastener positioned within the second aperture 120 to also extend through the fifth aperture 150. The sixth aperture 160 may enable a portion of a fastener positioned within the third aperture 130 to also extend through the sixth aperture 160.

The second aperture 120 is located a first distance D1 from the first aperture 110. The third aperture 130 is located a second distance D2 from the first aperture 110. The fourth aperture 140 is located a third distance D3 from the first aperture 110. The different distances D1, D2, D3 enable the linkage 100C to provide variable distances between tie rods as discussed herein. For example, a first tie rod may be connected to the linkage 100C via the first aperture 110 and a second tie rod may be connected to the linkage 100C via the second aperture 120 and the fifth aperture 150. In this configuration, the two tie rods are located a first distance D1 apart. If the second tie rod is connected to the linkage 100C via the third aperture 130 and the sixth aperture 160, the two tie rods would be located a second distance D2 apart. If the second tie rod is connected to the linkage 100C via the fourth aperture 140, the two tie rods would be located a third distance D3 apart. The three distances D1, D2, D3 differ in length. The lengths may be varied depending on the application. For example, in one application D1 may be 1 inch, D2 may be 2.0 inches, and D3 may be 3.0 inches. The number, size, shape, and/or configuration of the apertures 110, 120, 130, 140 may be varied as would be appreciated by one of ordinary skill in the art having the benefit of this disclosure. For example, the total number of apertures may be three (3), four (4), or more than four (4) depending on the application. Likewise, the size of the linkage and the distances between the apertures may also be varied within the scope of this disclosure.

The first aperture 110 may be orientated on a different plane than the second, third, fourth, fifth, and sixth apertures 120, 130, 140, 150, 160. For example, the first aperture 110 may be oriented vertically with respect to the linkage 100C and each of the second aperture 120, the third aperture 130, the fourth aperture 140, the fifth aperture 150, and the sixth aperture 160 may be orientated horizontally with respect to the linkage 100C. In other words, the axis of rotation of a fastener positioned within the first aperture 110 may be orientated in a normal direction with respect to the axes of rotation of fasteners positioned within either the second aperture 120, the third aperture 130, the fourth aperture 140, the fifth aperture 150, or the sixth aperture 160.

Figure 4:
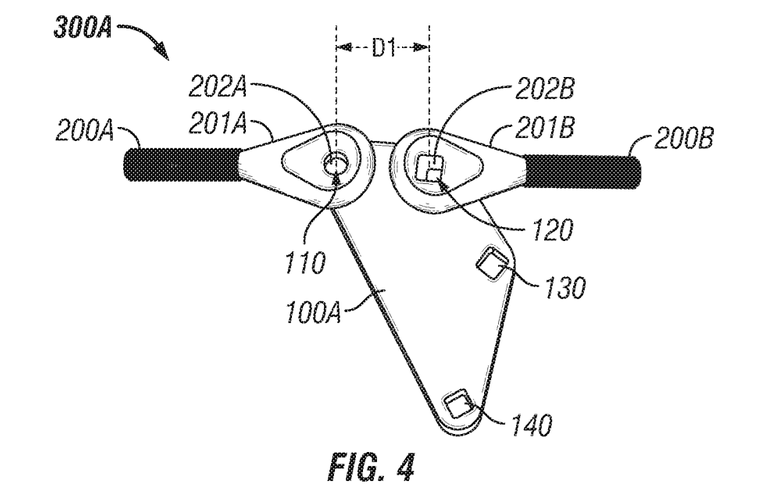
FIG. 4 shows a schematic of an example of a connecting system utilizing a variable length linkage.

FIG. 4 shows a schematic of an example of a connecting system 300A utilizing a variable length linkage 100A. The system 300A includes a first tie rod 200A that includes a first lug 201A having a first opening 202A. The first lug 201A is connected to the linkage 100A via a fastener, such as a pin or bolt, positioned through both the first opening 202A and the first aperture 110 of the linkage 100A. The system 300A in includes a second tie rod 200B that includes a second lug 201B having a second opening 202B. The second lug 201B is connected to the linkage 100A via a fastener, such as a pin or bolt, positioned through both the second opening 202B and the second aperture 120 of the linkage 100A. The fasteners are not shown in FIGS. 4-6 for clarity. The first opening 202A of the first lug 201A may have a circular cross-section and the second opening 202B of the second lug 201B may have a non-circular cross-section. The non-circular cross-section of the second lug 201B as well as the non-circular cross-section of the second aperture 120 may prevent rotation of the second tie rod 200B with respect to the linkage 100A. The first tie rod 200A and the second tie rod 200B are positioned a first distance D1 away from each other when the first tie rod 200A is connected to the linkage 100A via the first aperture 110 and the second tie rod 200B is connected to the linkage 100A via the second aperture 120.

Figure 5:
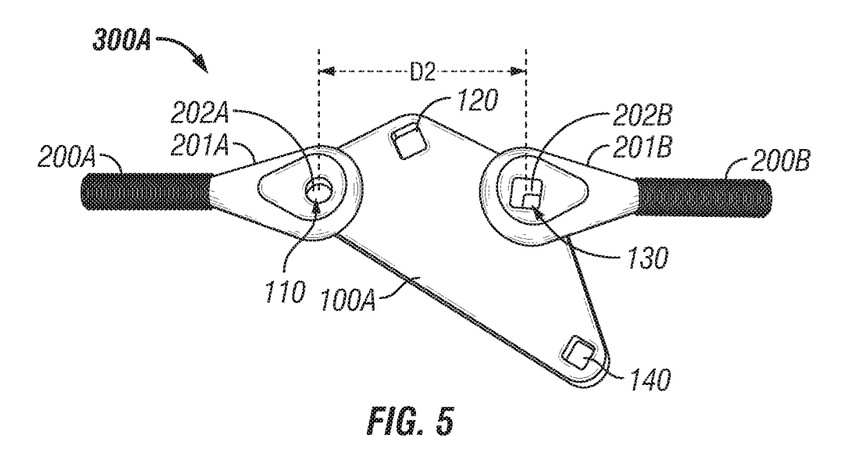
FIG. 5 shows a schematic of an example of a connecting system utilizing a variable length linkage.

FIG. 5 shows a schematic of an example of a connecting system 300A utilizing a variable length linkage 100A with the first tie rod 200A connected to the linkage 100A via the first aperture 110 and the second tie rod 200B connected to the linkage 100A via the third aperture 130. The first tie rod 200A and the second tie rod 200B are positioned a second distance D2 away from each other that differs from the first distance D1 shown in FIG. 4.

Figure 6:
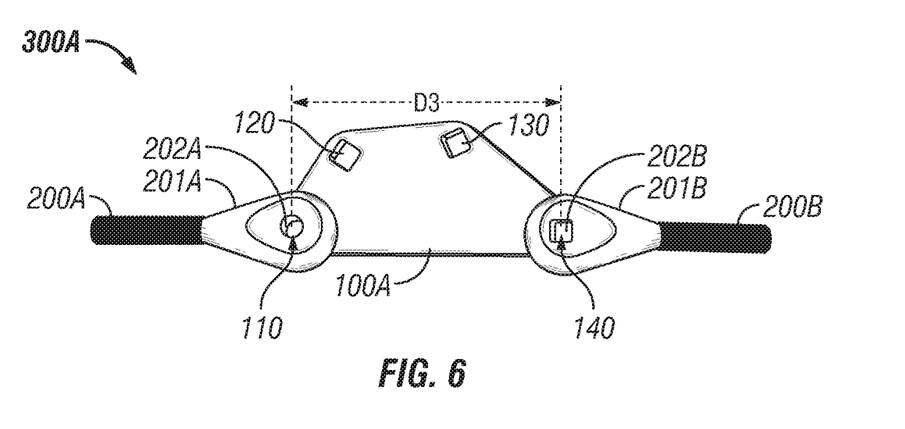
FIG. 6 shows a schematic of an example of a connecting system utilizing a variable length linkage.

FIG. 6 shows a schematic of an example of a connecting system 300A utilizing a variable length linkage 100A with the first tie rod 200A connected to the linkage 100A via the first aperture 110 and the second tie rod 200B connected to the linkage 100A via the fourth aperture 140. The first tie rod 200A and the second tie rod 200B are positioned a third distance D3 away from each other that differs from both the first distance D1 shown in FIG. 4 and the second distance D2 shown in FIG. 5. The system 300A of FIGS. 4-6 may be used to provide a variable distance between a first tie rod 200A and a second tie rod 200B.

Figure 7:
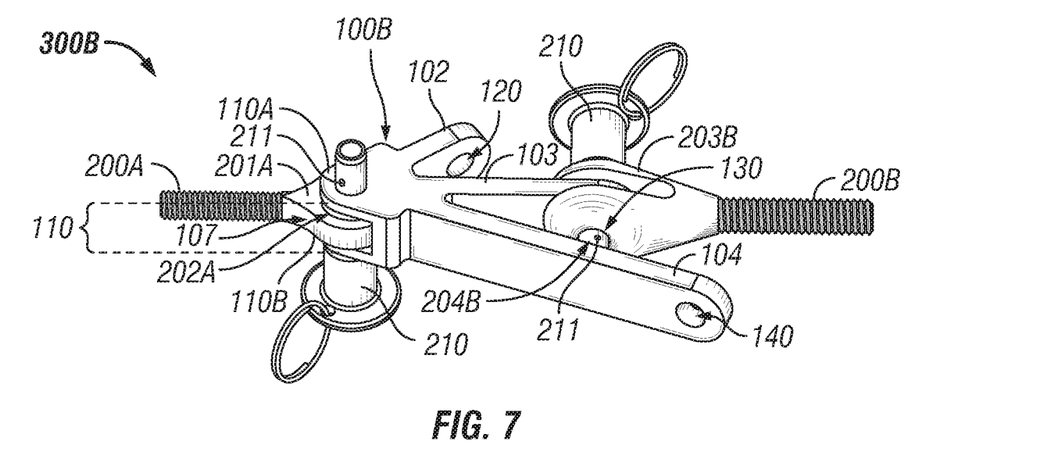
FIG. 7 shows a schematic of an example of a connecting system utilizing a variable length linkage.

FIG. 7 shows a schematic of an example of a connecting system 300B utilizing a variable length linkage 100B. The system 300B includes a first tie rod 200A that includes a first lug 201A having a first opening 202A. The first lug 201A is connected to the linkage 100B via a fastener, such as a pin or bolt, positioned through both the first opening 202A and the first apertures 110A, 110B (collectively the first aperture 110) of the linkage 100B. A pin 210 is inserted through the first aperture 110 and the first opening 202A to secure the first tie rod 200A to the linkage 100B. A detent 211 may be used to selectively secure the pin 210 within an aperture 120, 130, 140, of the linkage 100B. The system 300B in includes a second tie rod 200B that includes a clevis 203B having openings 204B through the clevis 203B. The second lug 201B is connected to the linkage 100B via a fastener, such as a pin or bolt, positioned through both the openings 204B in the clevis 203B and the third aperture 130 of the linkage 100B. A portion of the second finger 103 is positioned within the clevis 203B and a pin 210 is positioned through the openings 204B and the third aperture 130 to secure the second tie rod 200B to the linkage 100B.

As shown in FIG. 7, the pin 210 positioned through the first aperture 110 is oriented in a different plane than the pin 210 positioned through the third aperture 130. For example, the pin 210 through the first aperture 110 may be vertically oriented with respect to the linkage 100B and the pin 210 through the third aperture 130 may be horizontally oriented with respect to the linkage 100B.

The first tie rod 200A and the second tie rod 200B are positioned a first distance D2 (shown in FIG. 2) away from each other when the first tie rod 200A is connected to the linkage 100B via the first aperture 110 and the second tie rod 200B is connected to the linkage 100B via the third aperture 130. The first tie rod 200A may be positioned a first distance D1 (shown in FIG. 2) from the second tie rod 200B when the second tie rod 200B is connected to the linkage 100B via the second aperture 120. The first tie rod 200A may be positioned a third distance D3 (shown in FIG. 2) from the second tie rod 200B when the second tie rod 200B is connected to the linkage 100B via the fourth aperture 140. The system 300B may be used to provide a variable distance between a first tie rod 200A and a second tie rod 200B.

Figure 8:
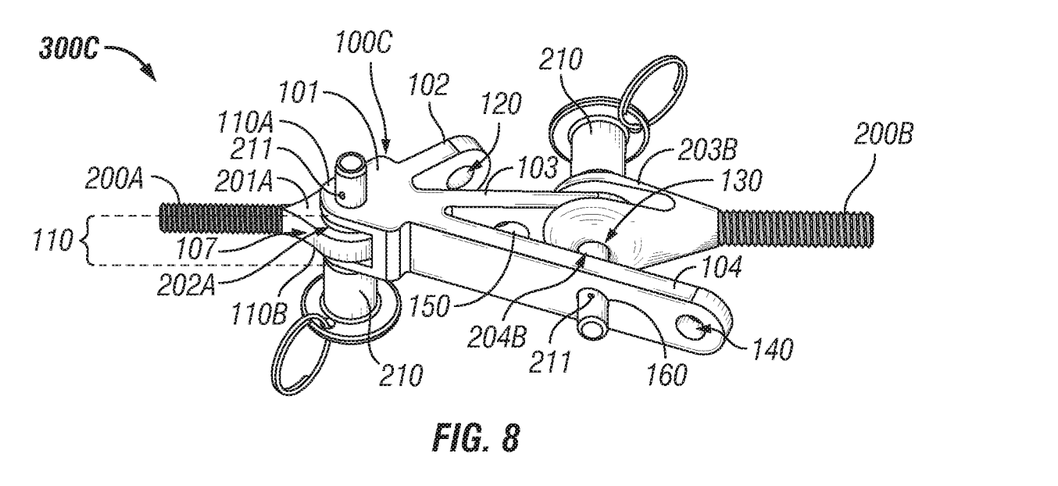
FIG. 8 shows a schematic of an example of a connecting system utilizing a variable length linkage.

FIG. 8 shows a schematic of an example of a connecting system 300C utilizing a variable length linkage 100C. The system 300C includes a first tie rod 200A that includes a first lug 201A having a first opening 202A. The first lug 201A is connected to the linkage 100C via a fastener, such as a pin or bolt, positioned through both the first opening 202A and the first apertures 110A, 110B (collectively the first aperture 110) of the linkage 100C. A pin 210 is inserted through the first aperture 110 and the first opening 202A to secure the first tie rod 200A to the linkage 100C. A detent 211 may be used to selectively secure the pin 210 within one or more apertures 120, 130, 140, 150, 160 of the linkage 100C. The system 300C in includes a second tie rod 200B that includes a clevis 203B having openings 204B through the clevis 203B. The second lug 201B is connected to the linkage 100C via a fastener, such as a pin or bolt, positioned through both the openings 204B in the clevis 203B and the third and sixth apertures 130, 160 of the linkage 100C. A portion of the second finger 103 is positioned within the clevis 203B and a pin 210 is positioned through the openings 204B and the third and sixth apertures 130, 160 to secure the second tie rod 200B to the linkage 100C.

As shown in FIG. 8, the pin 210 positioned through the first aperture 110 is oriented in a different plane than the pin 210 positioned through the third and sixth apertures 130, 160. For example, the pin 210 through the first aperture 110 may be vertically oriented with respect to the linkage 100C and the pin 210 through the third and sixth apertures 130, 160 may be horizontally oriented with respect to the linkage 100C.

The first tie rod 200A and the second tie rod 200B are positioned a first distance D2 (shown in FIG. 3) away from each other when the first tie rod 200A is connected to the linkage 100C via the first aperture 110 and the second tie rod 200B is connected to the linkage 100C via the third and sixth apertures 130, 160. The first tie rod 200A may be positioned a first distance D1 (shown in FIG. 3) from the second tie rod 200B when the second tie rod 200B is connected to the linkage 100C via the second and fifth apertures 120, 150. The first tie rod 200A may be positioned a third distance D3 (shown in FIG. 3) from the second tie rod 200B when the second tie rod 200B is connected to the linkage 100C via the fourth aperture 140. The system 300B may be used to provide a variable distance between a first tie rod 200A and a second tie rod 200B.

Figure 9:
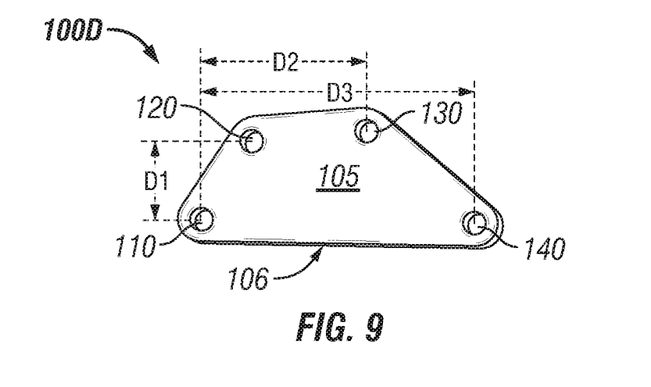
FIG. 9 shows a schematic of an example of a variable length linkage.

FIG. 9 shows a schematic of an example of a variable length linkage 100D. The linkage 100D includes a top surface 105 and a bottom surface 106. The linkage 100D includes a first aperture 110 through the linkage 100D, a second aperture 120 through the linkage 100D, a third aperture 130 through the linkage 100D, and a fourth aperture 140 through the linkage 100D. The apertures 110, 120, 130, 140 are configured to enable tie rods to be connected together via the linkage 100D as discussed herein.

The second aperture 120 is located a first distance D1 from the first aperture 110. The third aperture 130 is located a second distance D2 from the first aperture 110. The fourth aperture 140 is located a third distance D3 from the first aperture 110. The different distances D1, D2, D3 enable the linkage 100D to provide variable distances between tie rods as discussed herein. For example, a first tie rod may be connected to the linkage 100D via the first aperture 110 and a second tie rod may be connected to the linkage 100D via the second aperture 120. In this configuration, the two tie rods are located a first distance D1 apart. If the second tie rod is connected to the linkage 100D via the third aperture 130, the two tie rods would be located a second distance D2 apart. If the second tie rod is connected to the linkage 100D via the fourth aperture 140, the two tie rods would be located a third distance D3 apart. The three distances D1, D2, D3 differ in length. The lengths may be varied depending on the application. For example, in one application D1 may be 0.5 inch, D2 may be 1.0 inch, and D3 may be 1.5 inches. The number, size, shape, and/or configuration of the apertures 110, 120, 130, 140 may be varied as would be appreciated by one of ordinary skill in the art having the benefit of this disclosure. For example, the total number of apertures may be three (3), four (4), or more than four (4) depending on the application. Likewise, the size of the linkage and the distances between the apertures may also be varied within the scope of this disclosure. The shape of the apertures may be circular as shown in FIG. 9.

Figure 10:
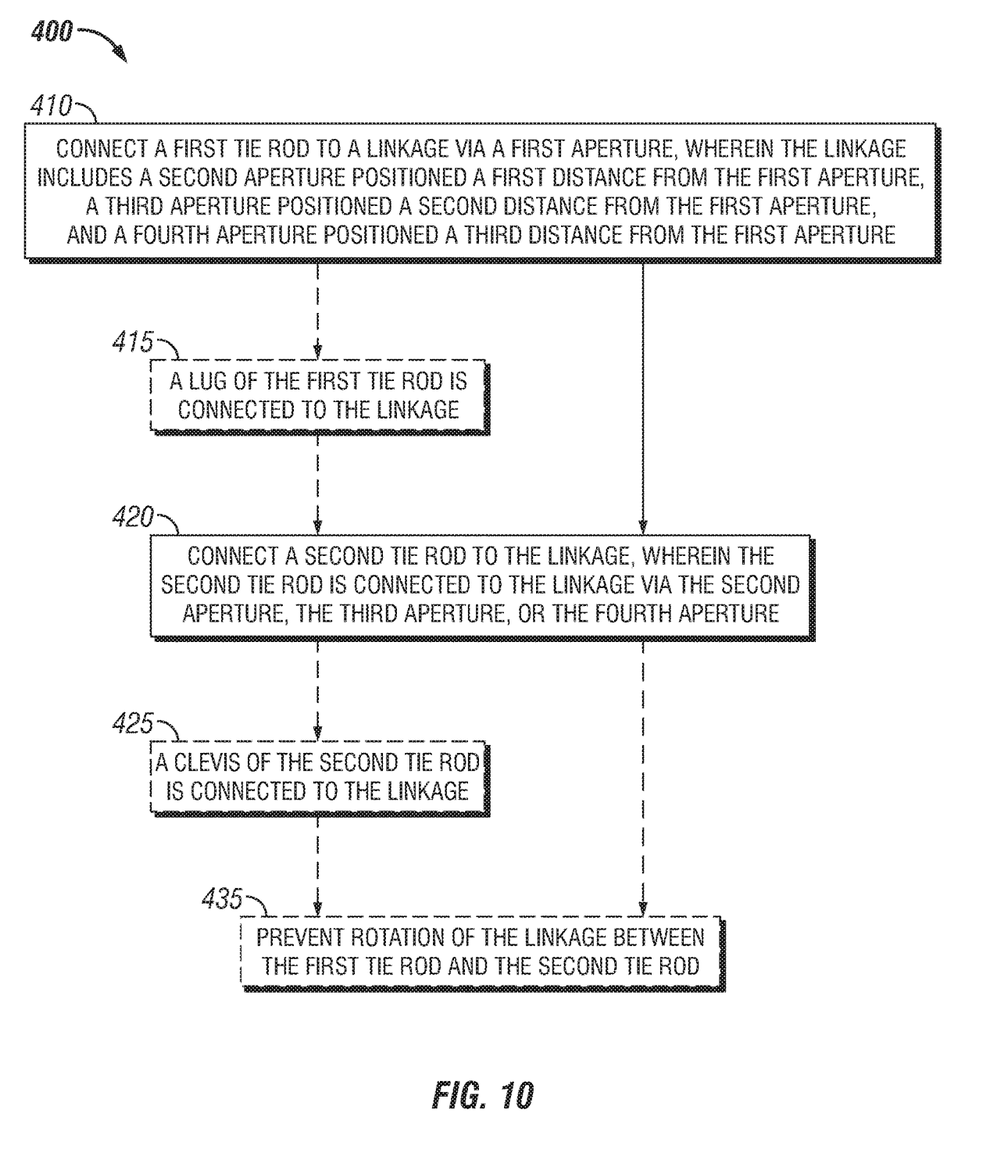
FIG. 10 is a flow chart of an example method for connecting two tie rods with a variable length linkage.

FIG. 10 is a flow chart of an example of a method 400 for connecting two tie rods with a variable length linkage. The method 400 includes connecting a first tie rod to a linkage via a first aperture, wherein the linkage includes a second aperture positioned a first distance from the first aperture, a third aperture positioned a second distance from the first aperture, and a fourth aperture positioned a third distance from the first aperture, at 410. For example, a first tie rod 200A may be connected to a first aperture 110 in a linkage 100A, 100D or a first tie rod 200A may be connected to a first aperture 110 through a base 101 of a linkage 100B, 100C. The method 400 includes connecting a second tie rod to the linkage, wherein the second tie rod is connected to the linkage via the second aperture, the third aperture, or the fourth aperture, at 420. For example, a clevis 203B of a second tie rod 200B may be connected to a finger 102, 103, or 104 of a linkage 100B, 100C via a fastener through a second aperture 120, a third aperture 130, or a fourth aperture 140. As another example, a second lug 201B of a second tie rod 200B may be connected to a linkage 100A, 100D via a second aperture 120, a third aperture 130, or a fourth aperture 140.

The method 400 may include a lug of the first tie rod is connected to the linkage, at 415. The method 400 may include a clevis of the second tie rod is connected to the linkage, at 425. The method 400 may include preventing rotation of the linkage between the first tie rod and the second tie rod, at 435.

Although this disclosure has been described in terms of certain embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof

What is claimed is:

1. An apparatus comprising:
   a linkage;
   a first aperture through the linkage;
   a second aperture through the linkage, wherein the second aperture is aligned with the first aperture on a first axis;
   a third aperture through the linkage, wherein the third aperture is aligned with the first aperture on a second axis that differs from the first axis;
   wherein there is a first distance between the first aperture and the second aperture;
   wherein there is a second distance between the first aperture and the third aperture, the second distance differs from the first distance;

a fourth aperture through the linkage, wherein there is a third distance between the first aperture and the fourth aperture, the third distance differs from the first distance and the second distance and wherein the fourth aperture is aligned with the first aperture on a third axis that differs from both the first axis and the second axis; and wherein the linkage comprises a base, a first finger that extends from the base, a second finger that extends from the base, and a third finger that extends from the base.

2. The apparatus of claim 1, wherein the second aperture, the third aperture, and the fourth aperture have a non-circular cross-section.

3. The apparatus of claim 2, wherein the first distance is 0.5 inch, wherein the second distance is 1.0 inch, and wherein the third distance is 1.5 inches.

4. The apparatus of claim 1, wherein the first aperture extends through the base, the second aperture extends through the first finger, the third aperture extends through the second finger, and the fourth aperture extends through the third finger.

5. The apparatus of claim 4, wherein the first distance is 1 inch, wherein the second distance is 2 inches, and wherein the third distance is 3 inches.

6. The apparatus of claim 4, wherein the first aperture is oriented vertically through the linkage and wherein the second aperture, the third aperture, and the fourth aperture are oriented horizontally through the linkage.

7. The apparatus of claim 6, wherein the second finger includes a fifth aperture and the third finger includes a sixth aperture.

8. A system comprising:
a linkage, the linkage including a first aperture, a second aperture, a third aperture, and a fourth aperture, wherein the linkage comprises a base, a first finger that extends from the base, a second finger that extends from the base, and a third finger that extends from the base;
a first tie rod connected to the linkage via the first aperture;
a second tie rod;
wherein the first tie rod is positioned a first distance from the second tie rod when the second tie rod is connected to the linkage via the second aperture;
wherein the first tie rod is positioned a second distance from the second tie rod when the second tie rod is connected to the linkage via the third aperture; and
wherein the first tie rod is positioned a third distance from the second tie rod when the second tie rod is connected to the linkage via the fourth aperture.

9. The system of claim 8, wherein the first tie rod comprises a first lug and wherein the second tie rod comprises a second lug.

10. The system of claim 9, wherein the first lug includes a first opening having a circular cross-section and wherein the second lug comprises a second opening having a non-circular cross-section.

11. The system of claim 10, wherein the second aperture, the third aperture, and the fourth aperture have non-circular cross-sections.

12. The system of claim 8, wherein the first aperture extends through the base, the second aperture extends through the first finger, the third aperture extends through the second finger, and the fourth aperture extends through the third finger.

13. The system of claim 12, wherein the first aperture is oriented vertically through the linkage and wherein the second aperture, the third aperture, and the fourth aperture are oriented horizontally through the linkage.

14. The system of claim 13, wherein the first tie rod comprises a lug configured to connect to the linkage via the first aperture and the second tie rod comprises a clevis configured to connect to the linkage via the second aperture, the third aperture, or the fourth aperture.

15. The system of claim 8, wherein the second finger includes a fifth aperture.

16. The system of claim 15, wherein the third finger includes a sixth aperture.

17. A method comprising:
connecting a first tie rod to a linkage via a first aperture, wherein the linkage includes a second aperture positioned a first distance from the first aperture, a third aperture positioned a second distance from the first aperture, and a fourth aperture positioned a third distance from the first aperture wherein the second aperture is aligned with the first aperture on a first axis, wherein the third aperture is aligned with the first aperture on a second axis that differs from the first axis, and wherein the fourth aperture is aligned with the first aperture on a third axis that differs from both the first axis and the second axis;
connecting a second tie rod to the linkage, wherein the second tie rod is connected to the linkage via the second aperture, the third aperture, or the fourth aperture; and
wherein connecting the first tie rod to the linkage further comprises connecting a lug of the first tie rod to the linkage and wherein connecting the second tie rod to the linkage further comprises connecting a clevis of the second tie rod to the linkage.

18. The method of claim 15, further comprising preventing rotation of the linkage between the first tie rod and the second tie rod.

19. A method comprising:
connecting a first tie rod to a linkage via a first aperture, wherein the linkage includes a second aperture positioned a first distance from the first aperture, a third aperture positioned a second distance from the first aperture, and a fourth aperture positioned a third distance from the first aperture wherein the second aperture is aligned with the first aperture on a first axis, wherein the third aperture is aligned with the first aperture on a second axis that differs from the first axis, and wherein the fourth aperture is aligned with the first aperture on a third axis that differs from both the first axis and the second axis;
connecting a second tie rod to the linkage, wherein the second tie rod is connected to the linkage via the second aperture, the third aperture, or the fourth aperture; and
wherein the linkage comprises a base, a first finger that extends from the base, a second finger that extends from the base, and a third finger that extends from the base.

20. The method of claim 19, further comprising preventing rotation of the linkage between the first tie rod and the second tie rod.

* * * * *